US011867384B2

(12) United States Patent
James et al.

(10) Patent No.: US 11,867,384 B2
(45) Date of Patent: Jan. 9, 2024

(54) REMOVABLE POSITIONING OF LIGHT FIXTURES

(71) Applicant: AXIS LIGHTING INC., Lasalle (CA)

(72) Inventors: Thomas James, Lasalle (CA); Howard Yaphe, Lasalle (CA); Andrew Miles, Lasalle (CA)

(73) Assignee: AXIS LIGHTING INC., Lasalle (CA)

( * ) Notice: Subject to any disclaimer, the term of this patent is extended or adjusted under 35 U.S.C. 154(b) by 0 days.

(21) Appl. No.: 17/718,167

(22) Filed: Apr. 11, 2022

(65) Prior Publication Data

US 2022/0235922 A1 Jul. 28, 2022
US 2022/0412542 A2 Dec. 29, 2022

Related U.S. Application Data

(63) Continuation-in-part of application No. 17/306,855, filed on May 3, 2021, now Pat. No. 11,359,800, (Continued)

(51) Int. Cl.
*F21V 21/04* (2006.01)
*F21S 8/02* (2006.01)
(Continued)

(52) U.S. Cl.
CPC ............ *F21V 21/045* (2013.01); *F21S 8/026* (2013.01); *F21V 21/048* (2013.01); *F21S 8/043* (2013.01); *F21Y 2103/00* (2013.01)

(58) Field of Classification Search
CPC ...... F21S 8/026; F21V 21/044; F21V 21/045; F21V 21/046
See application file for complete search history.

(56) References Cited

U.S. PATENT DOCUMENTS 3,512,313 A 5/1970 Harz
3,704,906 A 12/1972 Abercrombie
(Continued)

FOREIGN PATENT DOCUMENTS

KR 20110003394 4/2011

OTHER PUBLICATIONS

Alanod, "Products," accessed on-line at: https://alanod.com/products, (publicly available prior to Jun. 11, 2020).
(Continued)

*Primary Examiner* — Alexander K Garlen
(74) *Attorney, Agent, or Firm* — Barnes & Thornburg LLP

(57) ABSTRACT

A linear light fixture assembly for supporting a light fixture in a ceiling structure, comprises a light fixture mounting structure having a pair of opposed boundary regions configured to fit within a designated light fixture receiving region in the ceiling structure, and a plurality of spring elements configured to spaced outwardly from at least one of the boundary regions, each spring element having a mounting region configured to be anchored to the mounting structure and a free end region to extend therefrom and to be laterally outwardly biased in a first position to form a path of contact with a support surface region on the ceiling structure to anchor the structure in the receiving region, each of the spring elements configured to be movable toward the corresponding boundary region in a second position to release the path of contact to release the light fixture from the receiving region.

25 Claims, 12 Drawing Sheets

Related U.S. Application Data which is a continuation of application No. 16/676,109, filed on Nov. 6, 2019, now Pat. No. 10,995,939, which is a continuation of application No. 15/909,457, filed on Mar. 1, 2018, now Pat. No. 10,473,307, said application No. 17/306,855 is a continuation-in-part of application No. 16/899,047, filed on Jun. 11, 2020, now Pat. No. 11,143,814, said application No. 17/306,855 is a continuation-in-part of application No. 17/067,369, filed on Oct. 9, 2020, now Pat. No. 11,181,262, application No. 17/718,167, filed on Apr. 11, 2022 is a continuation-in-part of application No. 29/804,395, filed on Aug. 19, 2021, and a continuation-in-part of application No. 17/037,361, filed on Sep. 29, 2020, now Pat. No. 11,300,276.

(60) Provisional application No. 62/532,970, filed on Jul. 14, 2017, provisional application No. 62/521,795, filed on Jun. 19, 2017, provisional application No. 62/859,922, filed on Jun. 11, 2019, provisional application No. 62/991,535, filed on Mar. 18, 2020.

(51) Int. Cl.

| | |
|---|---|
| ***F21S 8/04*** | (2006.01) |
| ***F21Y 103/00*** | (2016.01) |

(56) References Cited

U.S. PATENT DOCUMENTS

| | | | | |
|---|---|---|---|---|
| 3,918,751 | A | 11/1975 | Blake | |
| 4,043,689 | A | 8/1977 | Spencer et al. | |
| 4,449,166 | A | 5/1984 | Sharp | |
| 5,997,158 | A * | 12/1999 | Fischer | F21V 23/04 362/374 |
| 6,132,069 | A * | 10/2000 | Sato | F21V 25/04 362/148 |
| 8,028,964 | B2 | 10/2011 | Monaco | |
| D669,208 | S | 10/2012 | Hierzer et al. | |
| 8,282,259 | B2 | 10/2012 | Itaya | |
| RE45,162 | E | 9/2014 | Hierzer | |
| 9,206,948 | B1 * | 12/2015 | Scribante | H05B 47/11 |
| 9,534,771 | B2 | 1/2017 | Wu et al. | |
| 9,726,339 | B2 | 8/2017 | Hierzer | |
| 10,151,435 | B2 | 12/2018 | Pearson | |
| 10,203,077 | B1 | 2/2019 | Bremser | |
| 10,222,013 | B2 | 3/2019 | Hierzer | |
| 10,330,269 | B2 * | 6/2019 | Hierzer | F21V 17/164 |
| 10,670,207 | B2 | 6/2020 | Hierzer | |
| 2005/0117333 | A1 | 6/2005 | Yoshida | |
| 2008/0086962 | A1 | 4/2008 | Jahn | |
| 2010/0213654 | A1 | 8/2010 | Lin | |
| 2010/0270903 | A1 * | 10/2010 | Jao | F21V 21/04 313/46 |
| 2011/0176295 | A1 | 7/2011 | Chang et al. | |
| 2011/0235342 | A1 * | 9/2011 | Liang | F21V 21/04 362/364 |
| 2011/0239503 | A1 * | 10/2011 | Liao | G09F 9/302 40/550 |
| 2012/0020067 | A1 | 1/2012 | Mai | |
| 2012/0182744 | A1 | 7/2012 | Santiago | |
| 2014/0268829 | A1 * | 9/2014 | Mandy | F21S 8/026 362/373 |
| 2015/0085476 | A1 * | 3/2015 | Mandy | F21V 29/773 362/147 |
| 2015/0233537 | A1 * | 8/2015 | Athalye | H05B 45/3725 362/147 |
| 2016/0010817 | A1 * | 1/2016 | Hierzer | F21V 21/048 362/147 |
| 2016/0138788 | A1 | 5/2016 | Sareyka et al. | |
| 2017/0343194 | A1 | 11/2017 | Campbell | |
| 2017/0356605 | A1 | 12/2017 | Hierzer | |
| 2018/0363888 | A1 * | 12/2018 | James | F21V 21/045 |
| 2019/0162392 | A1 | 5/2019 | Guerra et al. | |
| 2019/0271461 | A1 | 9/2019 | Hierzer | |
| 2019/0285265 | A1 * | 9/2019 | Lee | F21V 23/009 |
| 2020/0393610 | A1 * | 12/2020 | Miles | F21V 3/049 |
| 2022/0235922 | A1 * | 7/2022 | James | F21S 8/026 |

OTHER PUBLICATIONS

Enlighted, “Smart Sensors,” accessed on-line at: https://www.enlightedinc.com/system-and-solutions/iot-system/smart-sensors, (publicly available prior to Jun. 11, 2020).

XAL Inc., “Leno—Zero Plenum Luminaire,” (Apr. 29, 2015).

* cited by examiner

REMOVABLE POSITIONING OF LIGHT FIXTURES

CROSS REFERENCE TO RELATED APPLICATIONS

This application is a Continuation-in-Part of copending U.S. application Ser. No. 17/306,855, filed May 3, 2021, which is a Continuation of U.S. application Ser. No. 16/676,109, filed Nov. 6, 2019 (now U.S. Pat. No. 10,995,939), which is a Continuation of U.S. application Ser. No. 15/909,457, filed Mar. 1, 2018 (Now U.S. Pat. No. 10,473,307), which claims the benefit of priority under 35 U.S.C. § 119(e) to U.S. Provisional Patent Application No. 62/521,795, filed Jun. 19, 2017, entitled REMOVABLE POSITIONING OF LIGHT FIXTURES, and U.S. Provisional Patent Application No. 62/532,970, filed Jul. 14, 2017, entitled REMOVABLE POSITIONING OF LIGHT FIXTURES; this application is also a Continuation-in-Part of U.S. application Ser. No. 16/899,047, filed Jun. 11, 2020, entitled LUMINAIRE STRUCTURE, which claims the benefit of priority under 35 U.S.C. § 119(e) to U.S. Provisional Patent Application No. 62/859,922, filed Jun. 11, 2019, and to U.S. Provisional Patent Application No. 62/991,535, filed Mar. 18, 2020; this application is also a Continuation-in-Part of U.S. application Ser. No. 17/067,369, filed Oct. 9, 2020, entitled LUMINAIRE STRUCTURE, which claims the benefit of priority under 35 U.S.C. § 119(e) to U.S. Provisional Patent Application No. 62/991,535, filed Mar. 18, 2020; this application is also a Continuation-in-Part of copending U.S. application Ser. No. 17/037,361, filed Sep. 29, 2020, and a Continuation-in-Part of copending U.S. Design application Ser. No. 29/804,395, filed Aug. 19, 2021. The disclosures set forth in the referenced applications are incorporated herein by reference in their entireties.

FIELD OF THE DISCLOSURE

The present disclosure relates to light fixtures and other ceiling mountable articles and, for example, to methods and devices for positioning light fixtures in ceiling structures.

BACKGROUND

Light fixtures are widely used in ceiling structures formed from ceiling support grids made with t-bars or other supporting grid members. Installation involves forming the grid with a present a light fixture receiving region, usually with opposed exposed horizontal surfaces to engage opposed sides of the light fixtures, which are configured with releasable attachment mechanisms that permit them to be installed in the light fixture receiving region. Examples of such light fixtures are shown in US 2016/0010817 A1 to HIERZER, and US 2016/0138788 to Sareyka et al. In both instances, the releaseable attachment mechanisms rely on releaseable catches, akin to door latches or the like formed with a sloping edge portion and spring loaded. However, these mechanisms are relatively bulky and can be tedious to release. Furthermore, ongoing maintenance requires access to the light fixture either from above the ceiling structure, which can be limited in many cases, or complete removal of the fixture from the ceiling structure.

It may thus be desirable to provide novel approaches for positioning light fixtures in ceiling structures, or at least to provide the public with one or more useful alternatives.

SUMMARY

In an aspect, there is provided a light fixture assembly for supporting a light fixture in a ceiling structure. The assembly comprises a light fixture mounting structure having a pair of opposed boundary regions configured to fit within a designated light fixture receiving region in the ceiling structure, and a plurality of spring elements configured to be spaced outwardly from at least one of the boundary regions. Each spring element comprises a mounting region configured to be anchored to the mounting structure and a free end region to extend therefrom and to be laterally outwardly biased in a first position to form a path of contact with a support surface region on the ceiling structure to anchor the mounting structure in the receiving region. Each of the spring elements is configured to be movable toward the corresponding boundary region in a second position to release the path of contact to release the mounting structure from the receiving region.

In some exemplary embodiments, the light fixture mounting structure may be integrally formed with a light fixture body.

In some exemplary embodiments, the light fixture body may comprise a first boundary region which presents at least one support surface to engage a corresponding support surface on the ceiling structure, and a second boundary region with the plurality of spring elements to be positioned therealong.

In some exemplary embodiments, the second boundary region may include a recess to receive an anchor fastener extending through the mounting region of a corresponding spring element, for anchoring the spring element therealong.

In some exemplary embodiments each spring element may be provided as a flat spring.

In some exemplary embodiments, each spring element may include an opening to receive the anchor fastener, and a bend region adjacent the opening to delineate the mounting and free end regions.

In some exemplary embodiments, the light fixture body may define an opening, and further comprises a cover to close the opening. Each spring element may further comprise a hinge region adjacent the mounting region and opposite the free end region. The cover may be configured to engage the hinge region for movement of the cover relative thereto.

In some exemplary embodiments, the cover may include a number of hinge openings, each to receive a hinge region of a corresponding spring element. The hinge region may be hook shaped in cross section in some examples.

Some exemplary embodiments may further comprise one or more suspension structures to suspend the light fixture body when in a servicing mode with the opening laterally oriented below the ceiling structure for servicing.

In some exemplary embodiments, the cover may be configured to pivot relative to the hinge region toward an open position in which the cover is oriented below the light fixture body when in the servicing mode.

In some exemplary embodiments, the suspension structures may comprise at least two cables, ropes, chains and/or linkages, each of which is configured to be anchored between the first boundary region and a corresponding location adjacent the light fixture receiving region.

Some exemplary embodiments may further comprise an anchoring structure positionable on the light fixture body and configured to receive an end region of the suspension structure. A locking structure may be provided which is movable from a releasable positon to receive a designated mounting location on the suspension structure and a lock position to hold the suspension structure in the anchoring structure.

In some exemplary embodiments, the anchoring structure may include a designated anchoring location to engage the designated mounting location and a locking structure movable between releasable and locked positions to control access to one of said designated mounting and locking locations.

In some exemplary embodiments, the suspension structure may include a cable, and the designated mounting location may be provided by an enlarged cable end structure.

In some exemplary embodiments, the anchoring structure may include a yoke portion to receive the enlarged cable end structure. The yoke portion may further comprise a gap to receive the cable. The locating structure may further comprise a tab configured to extend across the gap in the locking position to hold the cable in the gap.

In another aspect, there is provided a linear light fixture mounting structure comprising a pair of opposed boundary regions configured to fit within a designated light fixture receiving region in a ceiling structure. At least one spring element is to extend outwardly from the mounting structure, the at least one spring element having a free end configured to abut a support surface open to the light fixture receiving region, to provide at least one path of contact between the at least one spring element and the support surface to hold the light fixture mounting structure in an operative position in the light fixture receiving region. The at least one spring element is configured to be flexed inwardly toward the light fixture mounting structure to release the free end from the path of contact with the support surface, and thereby to release the light fixture mounting structure from the light fixture receiving region.

In some exemplary embodiments, the at least one spring element may include a plurality of flat springs.

In another aspect, there is provided a linear light fixture for installation in a ceiling structure, comprising an elongate body configured to be received in a light fixture receiving region in the ceiling structure. The elongate body includes an elongate opening when in a servicing mode and an elongate cover hingedly engaged to the elongate body adjacent a first boundary of the elongate opening to cover the opening. One or more suspension structures are configured to be coupled between the body adjacent a second boundary of the opening and the ceiling structure. The light fixture is configured to be releasable from an operative mode in the elongate receiving region to a servicing mode when suspended by the suspension structures below the ceiling structure with the first boundary of the elongate opening positioned below the second boundary, and the cover oriented below the first boundary in the servicing mode to laterally present the opening and/or an inside surface of the cover laterally, thereby to permit servicing of components in the housing and/or on the inside and/or an outside surface of the cover.

In another aspect, there is provided a linear light fixture for installation in a linear light fixture receiving region in a ceiling structure, comprising a linear light fixture body configured to locate in the linear light fixture receiving region in an operative mode. The linear light fixture body comprises a pair of linear light fixture body sections pivotally coupled about a pivot axis along adjacent first longitudinal edge regions thereof. One of the light fixture body sections is configured to be suspended from the ceiling structure at a second longitudinal edge region opposite the first longitudinal edge region thereof, wherein in a servicing mode the linear light fixture body sections open by pivoting relative to the pivot axis to expose opposed inner surfaces on the respective linear light fixture body sections in a lateral direction relative to the ceiling structure to enable serviceable access to components installed in or on one or both of the body sections.

Some exemplary embodiments may further comprise a plurality of suspension structures configured to extend between the ceiling structure and the second longitudinal edge region.

In some exemplary embodiments, the linear light fixture body is configured for attachment to a neighbouring linear light fixture body or an intermediate structure, while in the servicing mode.

In another aspect, there is provided a method of assembling a plurality of linear light fixtures as defined in any aspect, exemplary embodiment or example in the present disclosure or claims, comprising providing a plurality of instances of the linear light fixture, installing each of the instances in the servicing mode by joining a plurality of the suspension structures between each the instances and the corresponding receiving region, joining the instances together directly or indirectly to form a unitary linear light fixture assembly, and installing the unitary linear light fixture assembly in the corresponding receiving region.

BRIEF DESCRIPTION OF THE FIGURES

Several exemplary embodiments of the present disclosure will be provided, by way of examples only, with reference to the appended drawings, wherein.

DETAILED DESCRIPTION

Figure 1:
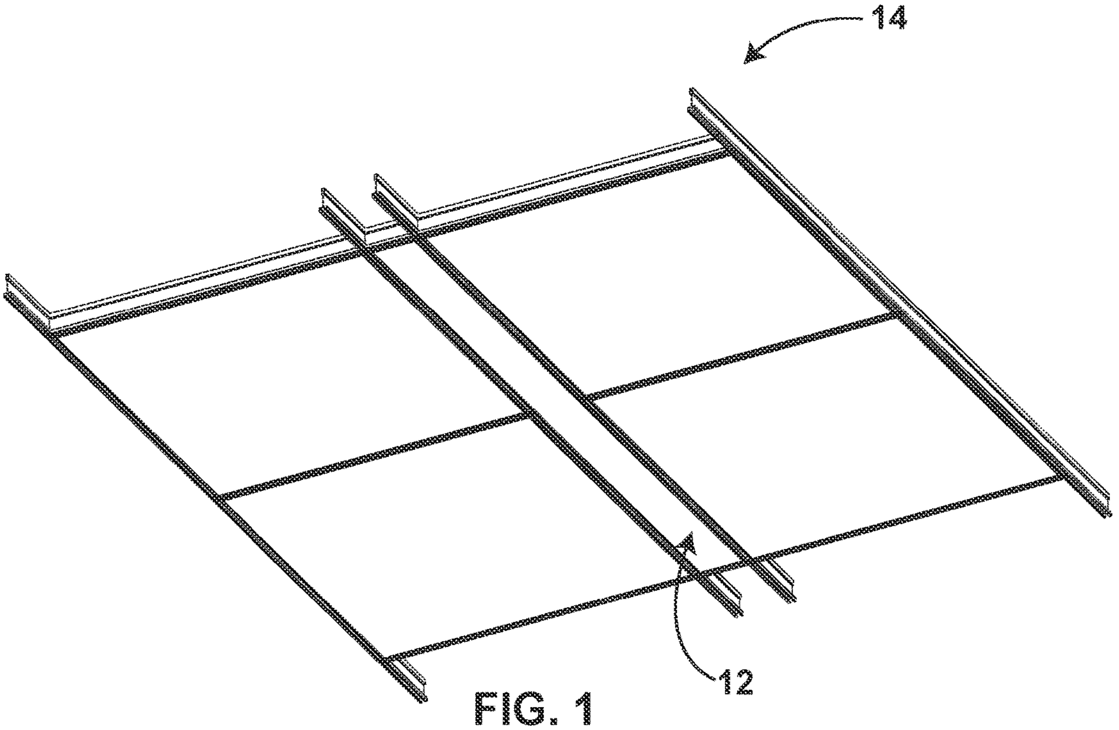
FIGS. 1 and 2 are perspective views of a light fixture installation in respective configurations.
Figure 2:
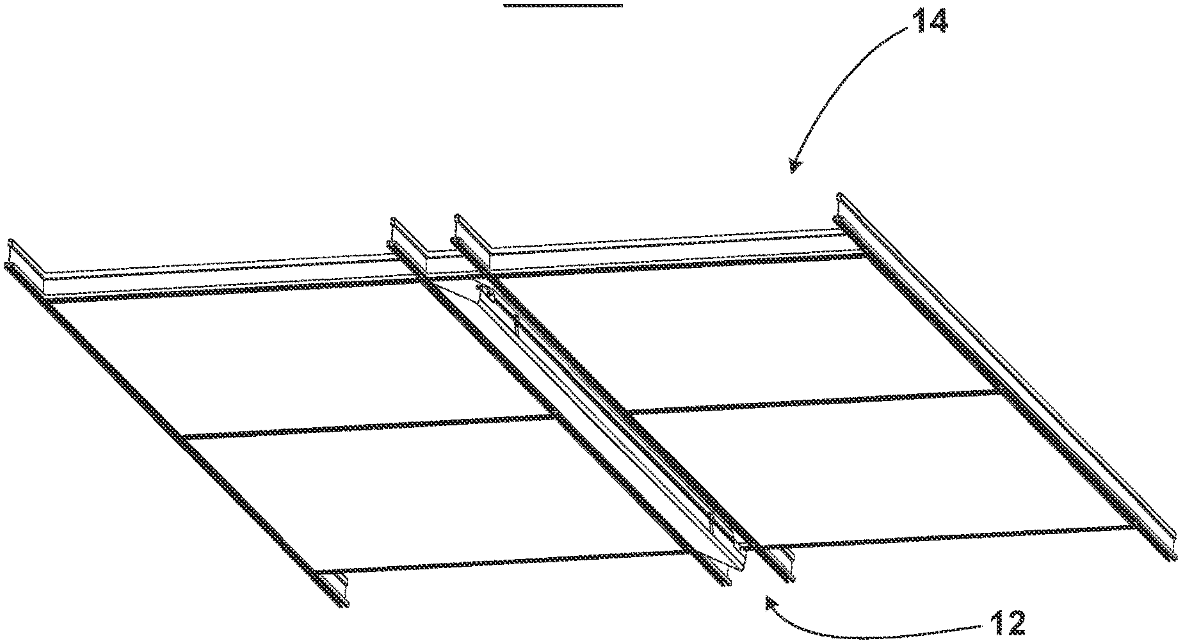

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled,"

and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

An exemplary embodiment is shown in FIGS. 1 to 4, wherein there is provided a light fixture assembly 10 (FIG. 4) for supporting a light fixture 12 in a ceiling structure 14. The light fixture 12 is, in this case, a linear light fixture, while other exemplary embodiments may include non-linear light fixtures. The assembly 10 comprises a light fixture mounting structure generally shown at 16 in FIG. 4, having a pair of opposed boundary regions 18, 20 which are configured to fit within a designated light fixture receiving region 22 in the ceiling structure. A plurality of spring elements 24 are configured to be spaced outwardly from at least one of the boundary regions. In this case, the spring elements 24 are of a flat spring configuration and are formed from a metal blank by one or more bending functions to the structure as shown more particularly in FIG. 7. Other exemplary embodiments may utilize spring elements of other configurations, such as by being formed integrally with a mounting structure or a portion thereof, to provide one or more of the functions and features as disclosed herein.

Figure 5:
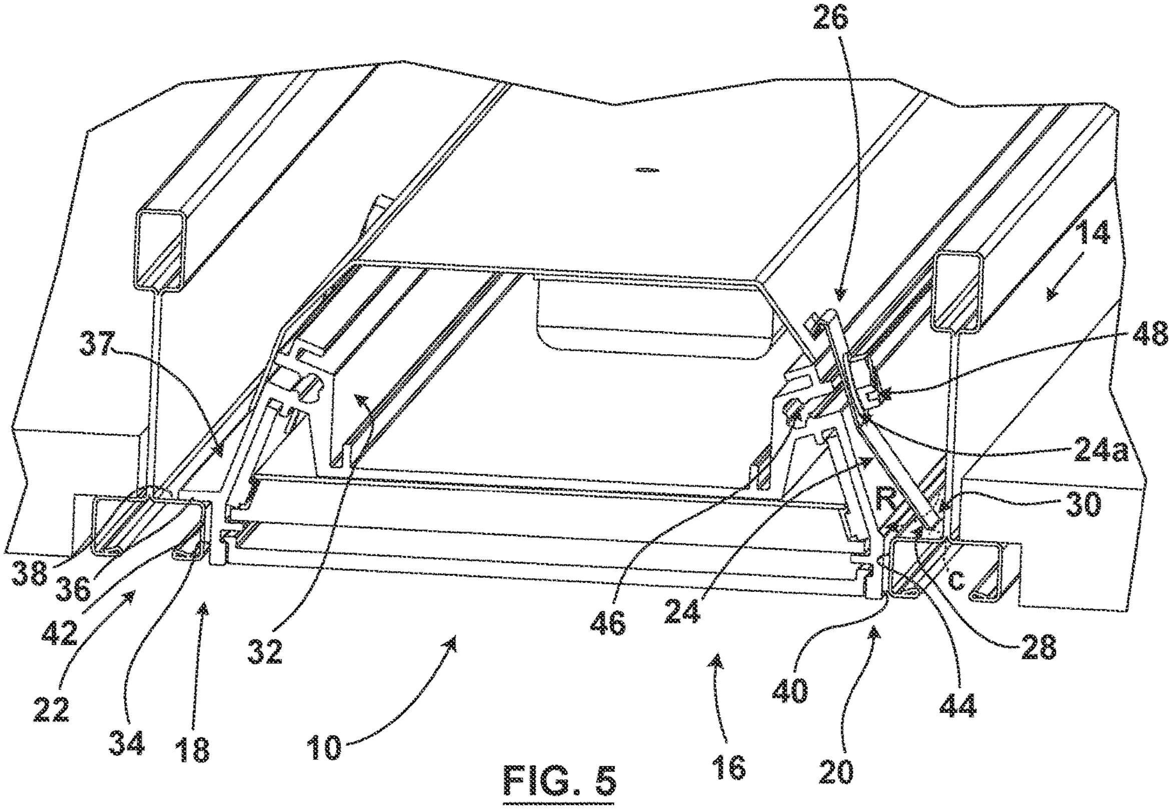
FIG. 5 is a magnified perspective sectional view of a portion of the installation according to FIG. 1.

Referring to FIG. 5, each spring element 24 has a mounting region 26 configured to be anchored to the mounting structure 16 and a free end region 28 to extend therefrom and to be laterally outwardly biased in a first position, as shown in FIG. 5, to form a path of contact (for example a line of contact) C with a support surface 30 on the ceiling structure 14 to anchor the mounting structure 16 in the receiving region 22. Each of the spring elements 24 is configured to be movable (as represented by arrow R) toward the boundary region 20 in a second position, to release the path of contact "C", and thereby to release the mounting structure 16 and thus the light fixture 12, from the light fixture receiving region 22.

In the present exemplary embodiment, the light fixture mounting structure 16 is integrally formed with a light fixture body 32. In some exemplary embodiments, the light fixture mounting structure 16 may provide a mounting location for one or more light fixtures joined thereto, while providing the benefits of the mode by which the mounting structure 16 may be installed in the light fixture receiving region 22. The light fixture body 32, in this case, is formed, at least in part, from an extrusion process, though other manufacturing processes may also be utilized as desired.

Figure 3:
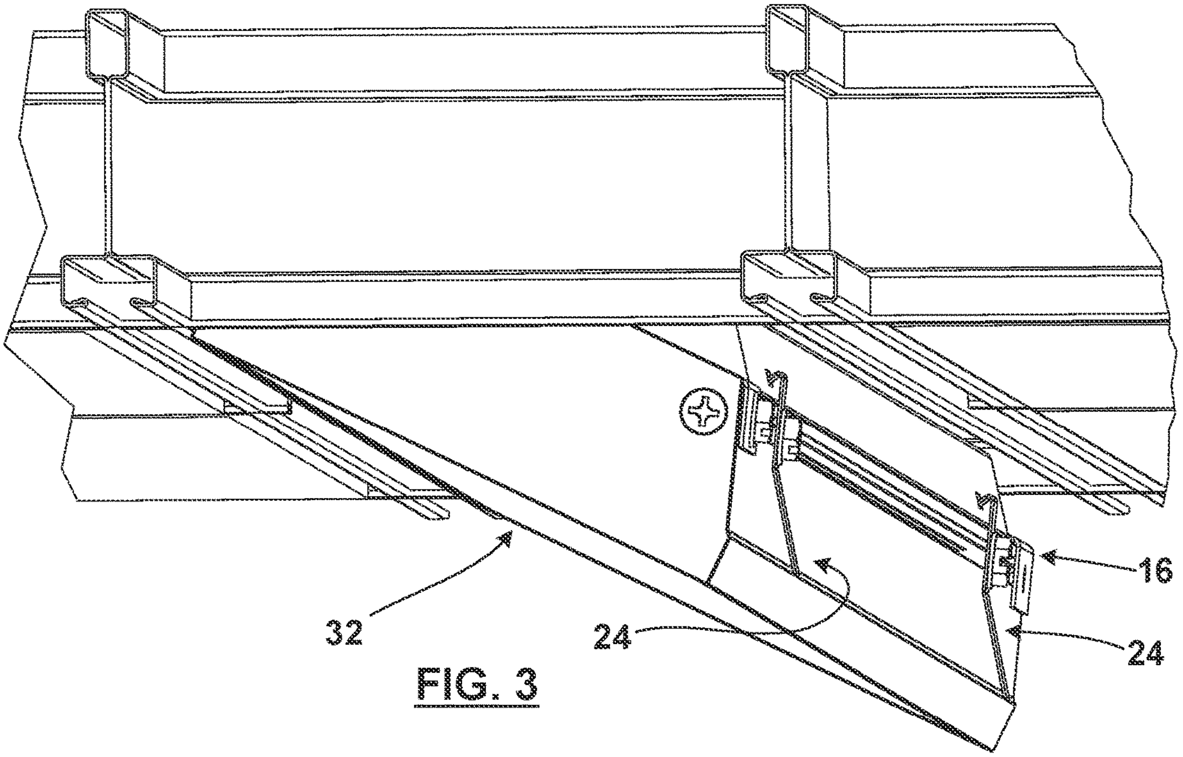
FIG. 3 is a magnified perspective view of a portion of the installation according to FIG. 2.
Figure 4:
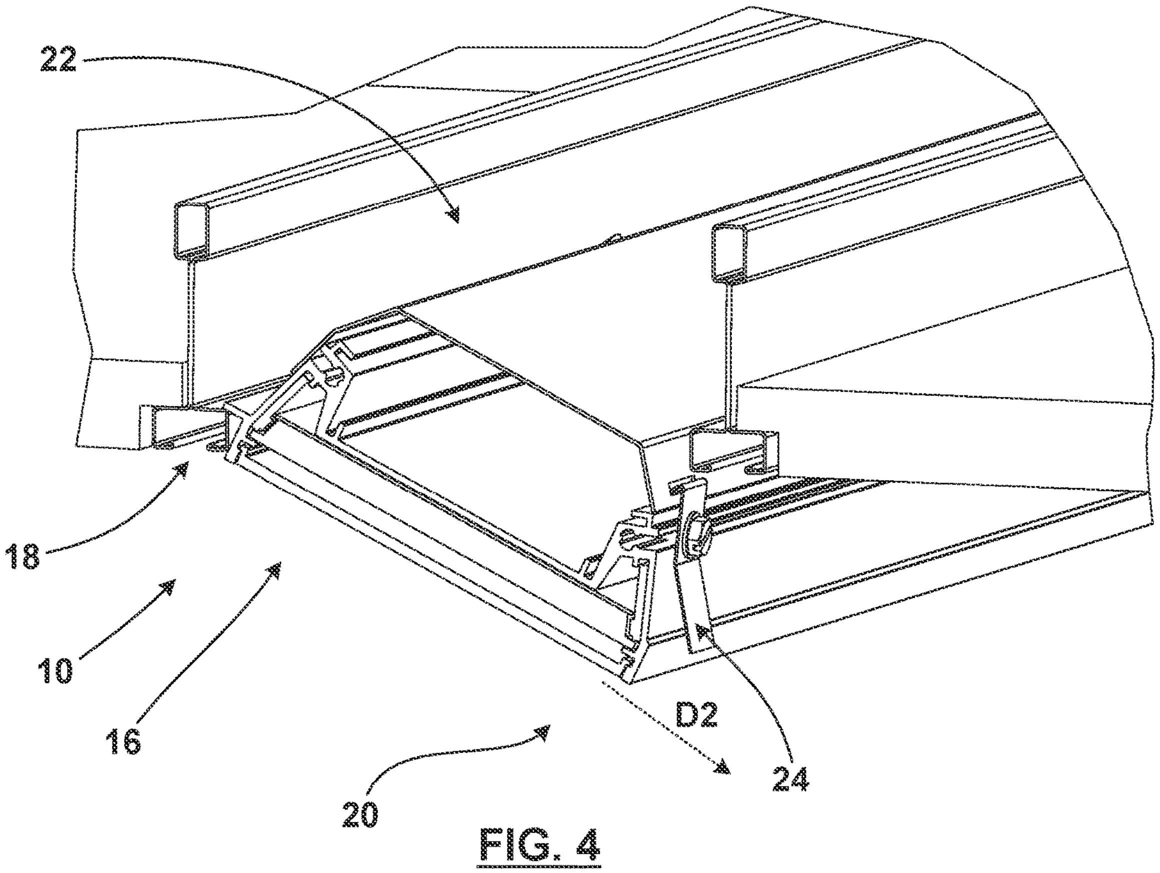
FIG. 4 is a magnified perspective sectional view of the installation shown in FIG. 3.

Referring to FIG. 5, the boundary region 18 presents at least one support surface 36 on an outwardly extending flange 37 to engage a corresponding support surface 38 on the ceiling structure 14 adjacent the light fixture receiving region 22, while the spring elements 24 are positioned along the second boundary region 20. The first and second boundary regions 18, 20 each provide a respective surface 34, 40 (as viewed in FIGS. 5 and 6), to be positioned adjacent corresponding upright surfaces 42, 44 on the ceiling structure 14 and to face the light fixture receiving region 22. Thus, in some exemplary embodiments, the spring elements 24 are mounted only along the boundary region 20 though, in other exemplary embodiments, the spring elements 24 may also be provided along the boundary region 18 in place of the support surface 36. In the present exemplary embodiment, the spring elements 24 are configured to lock the mounting structure 16 in position in the light fixture receiving region 22 as a second step, following a first step of placing the boundary region 18 in an initial position with the associated support surface 36 in contact with the support surface 38, as shown in FIGS. 3 and 4.

Figures 7, 8:
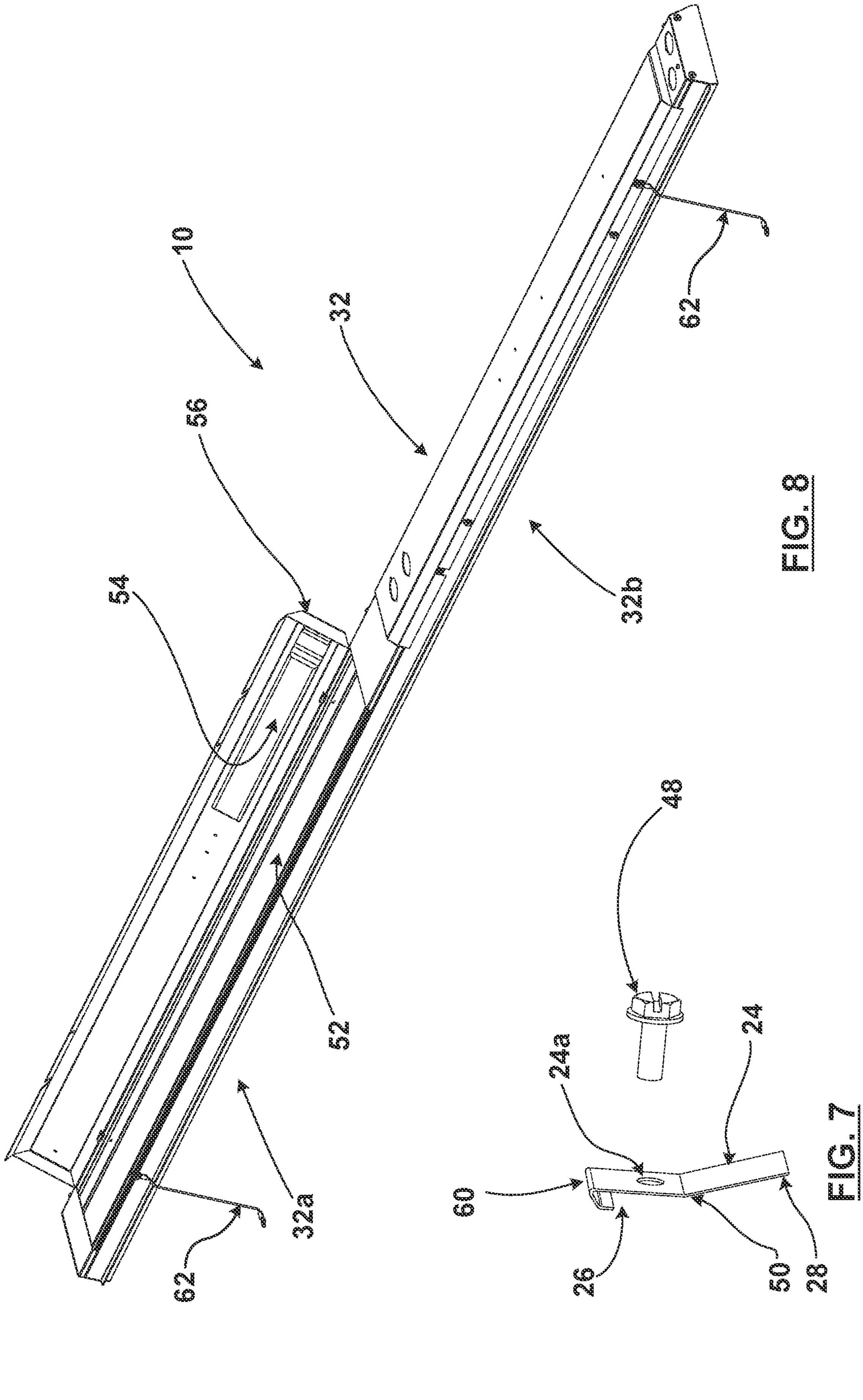
FIG. 7 is an exploded view of components of the installation of FIGS. 5 and 6.
FIGS. 8 and 9 is perspective views of a light fixture assembly of the installation according to FIG. 1 in another configuration.

Referring to FIG. 5, the boundary region 20 may include a recess 46 to receive an anchor fastener 48, for anchoring a corresponding spring element 24. Each spring element 24 may thus be provided with an opening **24*a* (as seen in FIG. 7) to receive the anchor fastener 48, though other configurations may also be utilized to anchor the spring element 24 and, for example, by the anchor fastener 48, such as by the use of intermediate clamping elements between the anchor fastener 48 and the spring element 24 which may be integral to the anchor fastener 48 or the spring element 24. The spring element 24 may also be provided with a bend line or region 50 (as shown in FIG. 7), in the present exemplary embodiment adjacent the opening 24*a*, to delineate the mounting and free end regions 26, 28, though the spring element 24 may alternatively provide a gradual transition between the mounting region 26 and the free end region 28**.

Figure 9:
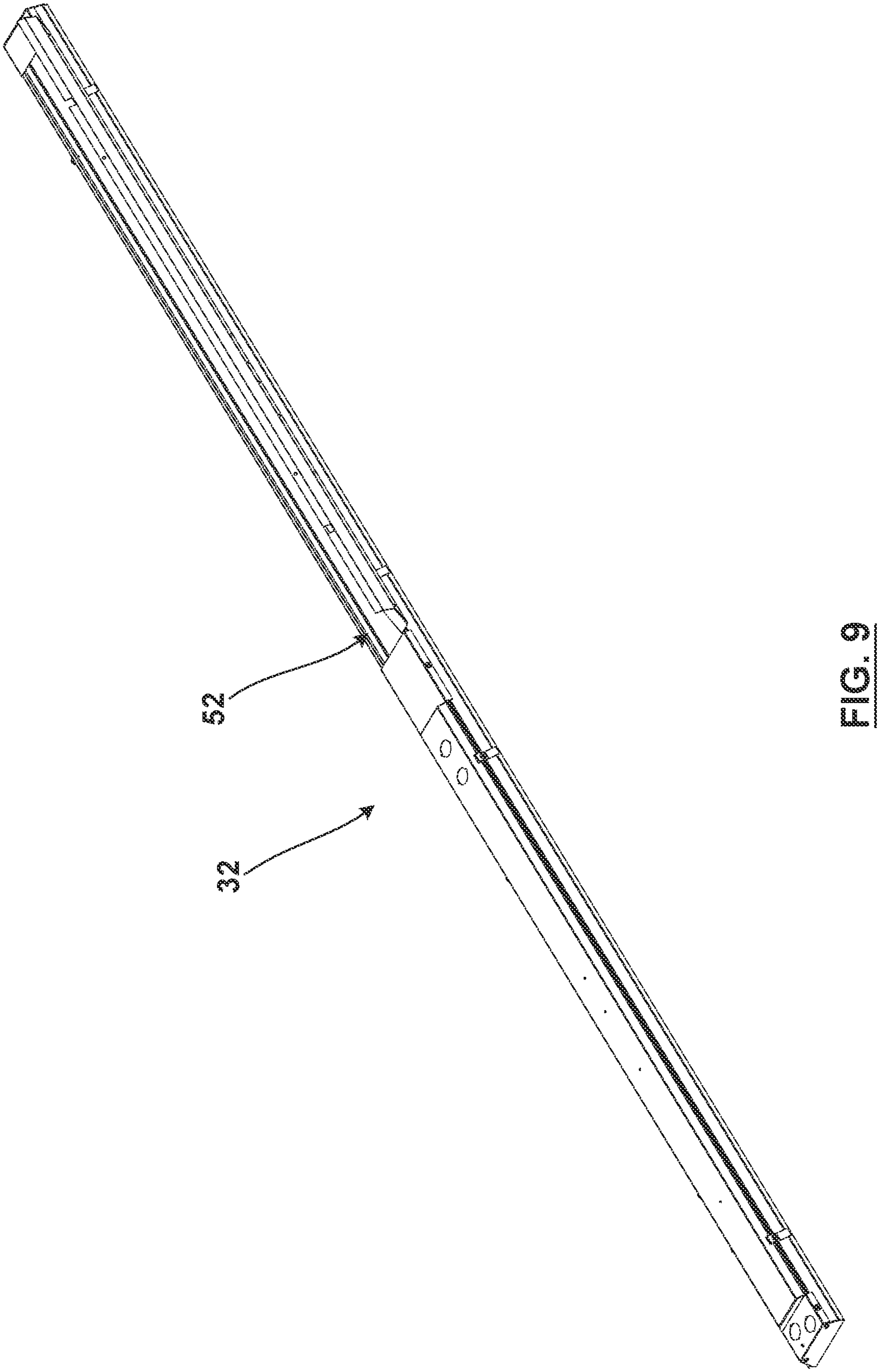
Figure 12:
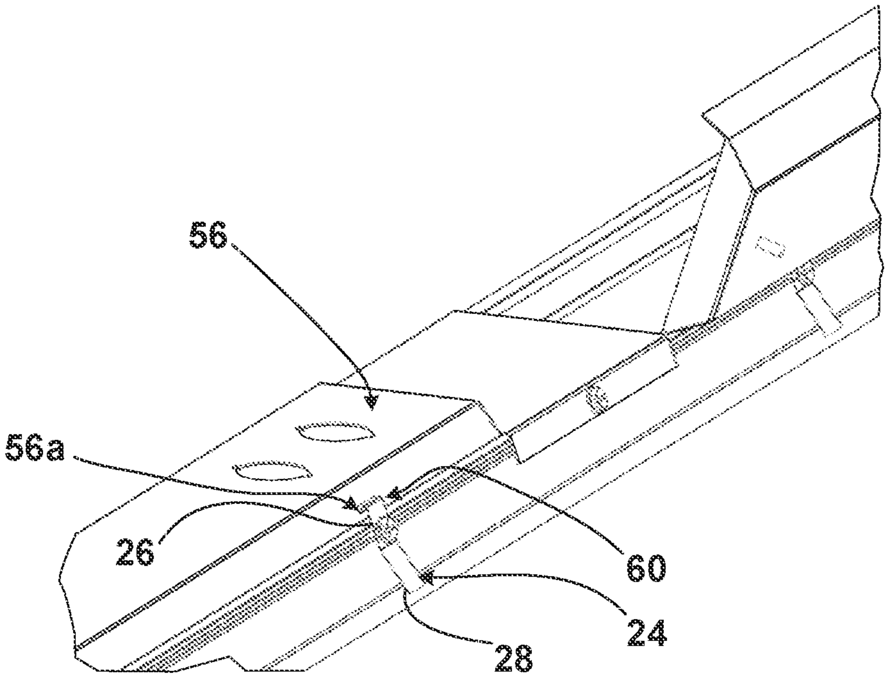
FIG. 12 is a magnified perspective view of a portion of the light fixture of FIGS. 8 and 9.
Figure 13:
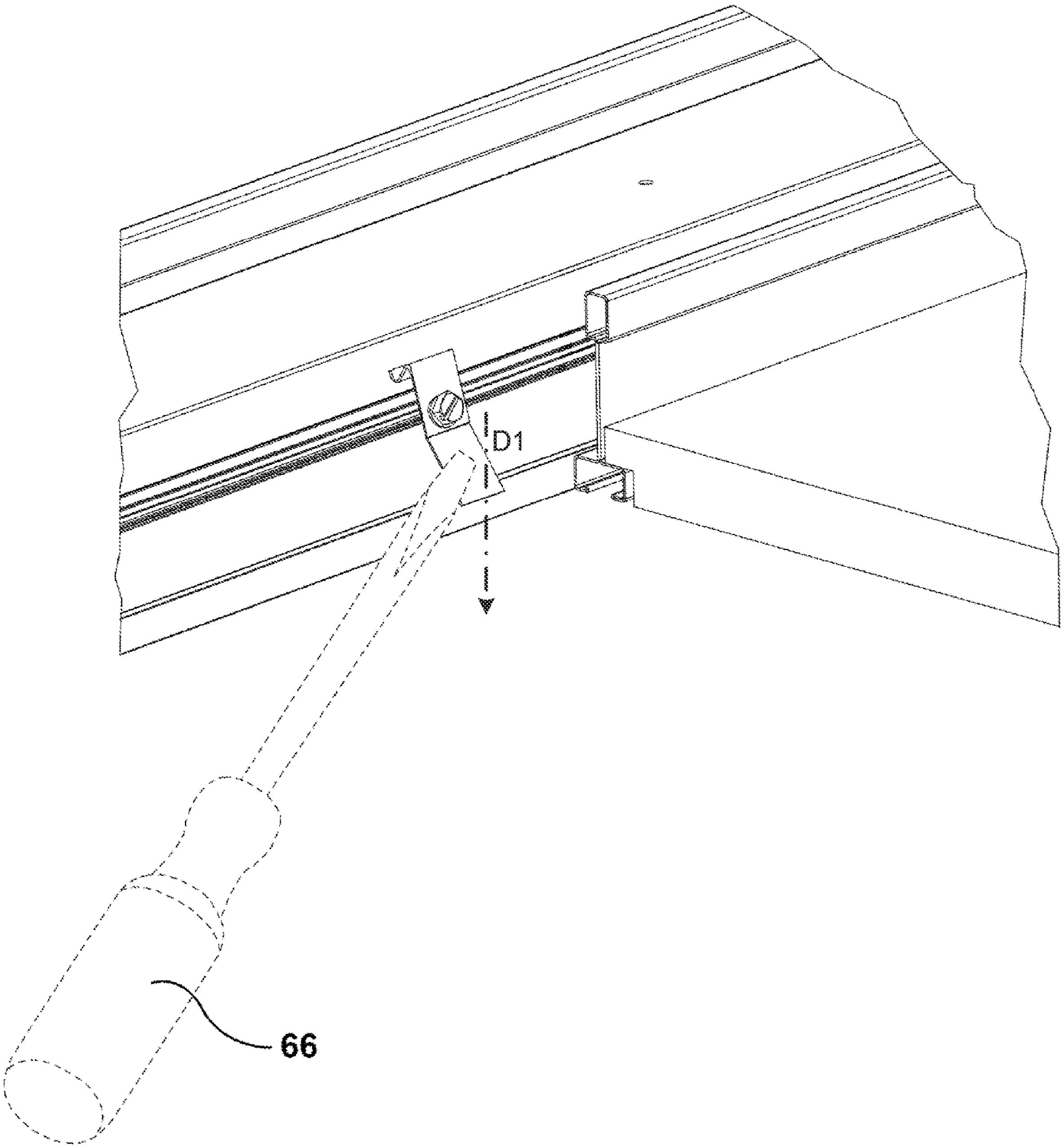
FIG. 13 is a further magnified perspective view of a portion of the light fixture of FIG. 12 with a tool.

Referring to FIGS. 8 and 9, the body 32 may be formed from a number of segments, in this case two as shown at **32*a* and 32*b*, to form the linear light fixture assembly 10. The body 32 may be further configured to provide an opening 52 to access light fixture components 54 therein, along with a cover 56 to close the opening 52. In this case, the light fixture components may be mounted in the body 32, or on the inside surface of the cover 56, or both. Referring to FIGS. 7, 12 and 13, each spring element 24 may further comprise a hinge region 60 adjacent the mounting region 26 and opposite the free end region 28, so that the cover 56 may be configured to engage the hinge region 60 for movement of the cover 56 relative thereto. As shown in FIG. 12, the cover may include a number of hinge openings 56*a*, each to receive a corresponding hinge region 60. Further, as seen in FIG. 7, in some exemplary embodiments, the hinge region 60 may be configured, such as for example in a hook-shape in cross section, to provide that the cover 56 remains engaged therewith during its range of travel between its open and closed positions, as both represented in FIG. 8, for segments 32*a* and 32*b*** respectively.

In some exemplary embodiments as shown in FIGS. 5, 6, 10 and 11, the assembly 10 may provide one or more suspension structures 62 to suspend the body 32 when in a servicing mode with the opening 52 laterally oriented below the ceiling structure 14 for servicing. In this case, the cover 56 may be configured to hinge relative to the mounting region 26 to an open position, for example with the cover 56 oriented below the body 32 when in the servicing mode, or otherwise configured to present the light fixture components for servicing.

Figure 6:
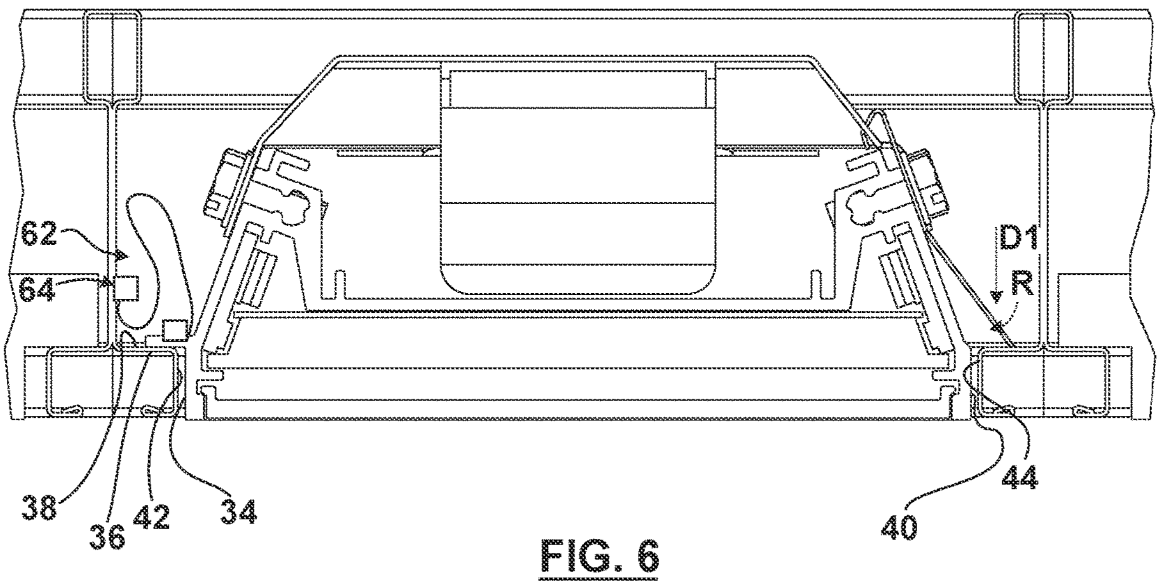
FIG. 6 is a side view of the portion shown in FIG. 5.

The suspension structures 62 may be provided in the form of at least two cables 62, ropes, chains and/or linkages or the like, to be anchored or coupled between the boundary region 18 and a corresponding location adjacent the light fixture receiving region 22, such as on a structure above the surface 38 as shown by the fastener 64 in FIG. 6.

Figure 11:
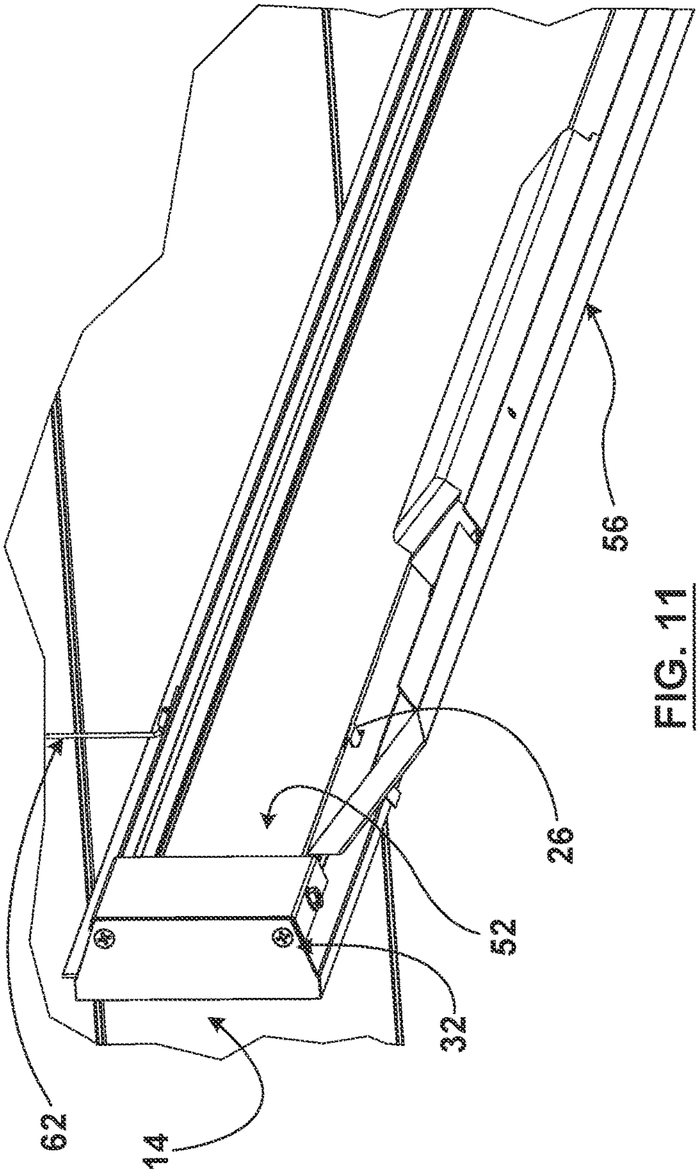
FIG. 11 is a magnified perspective view of a portion of the installation of FIG. 10.
Figure 11A:
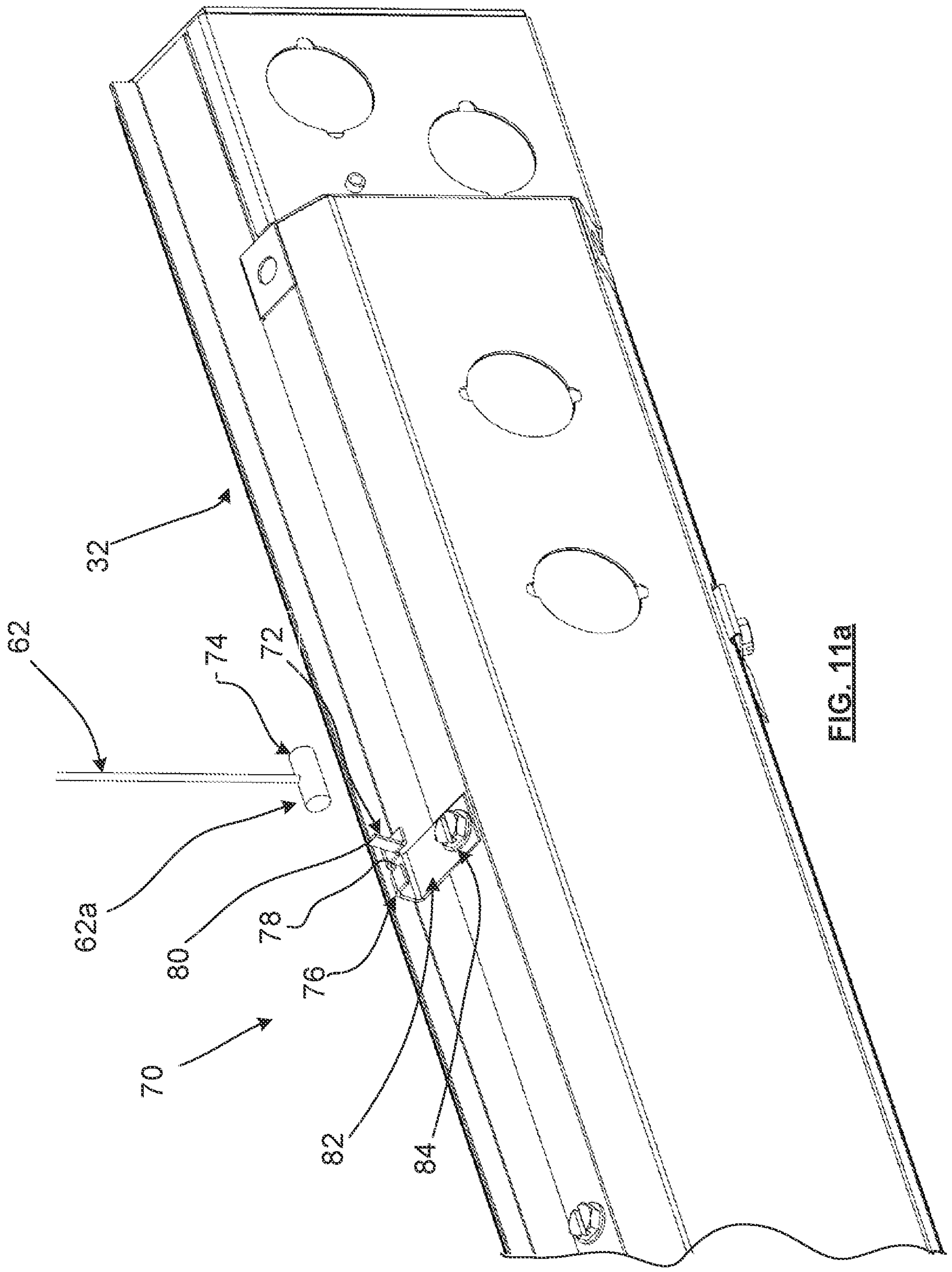
FIGS. 11*a* to 11*e* are fragmentary perspective views of portions of another installation.
Figure 11B:
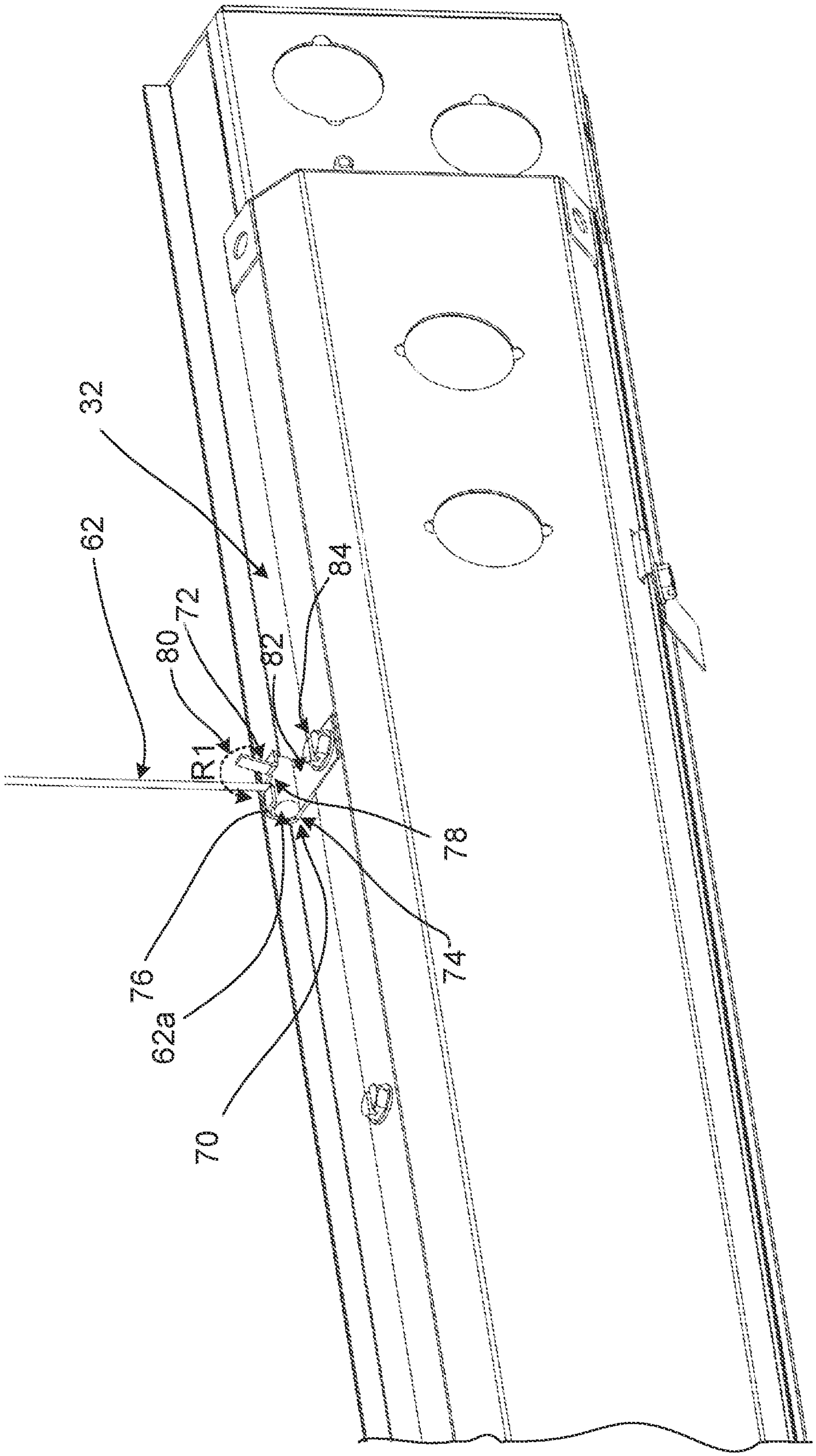
Figure 11C:
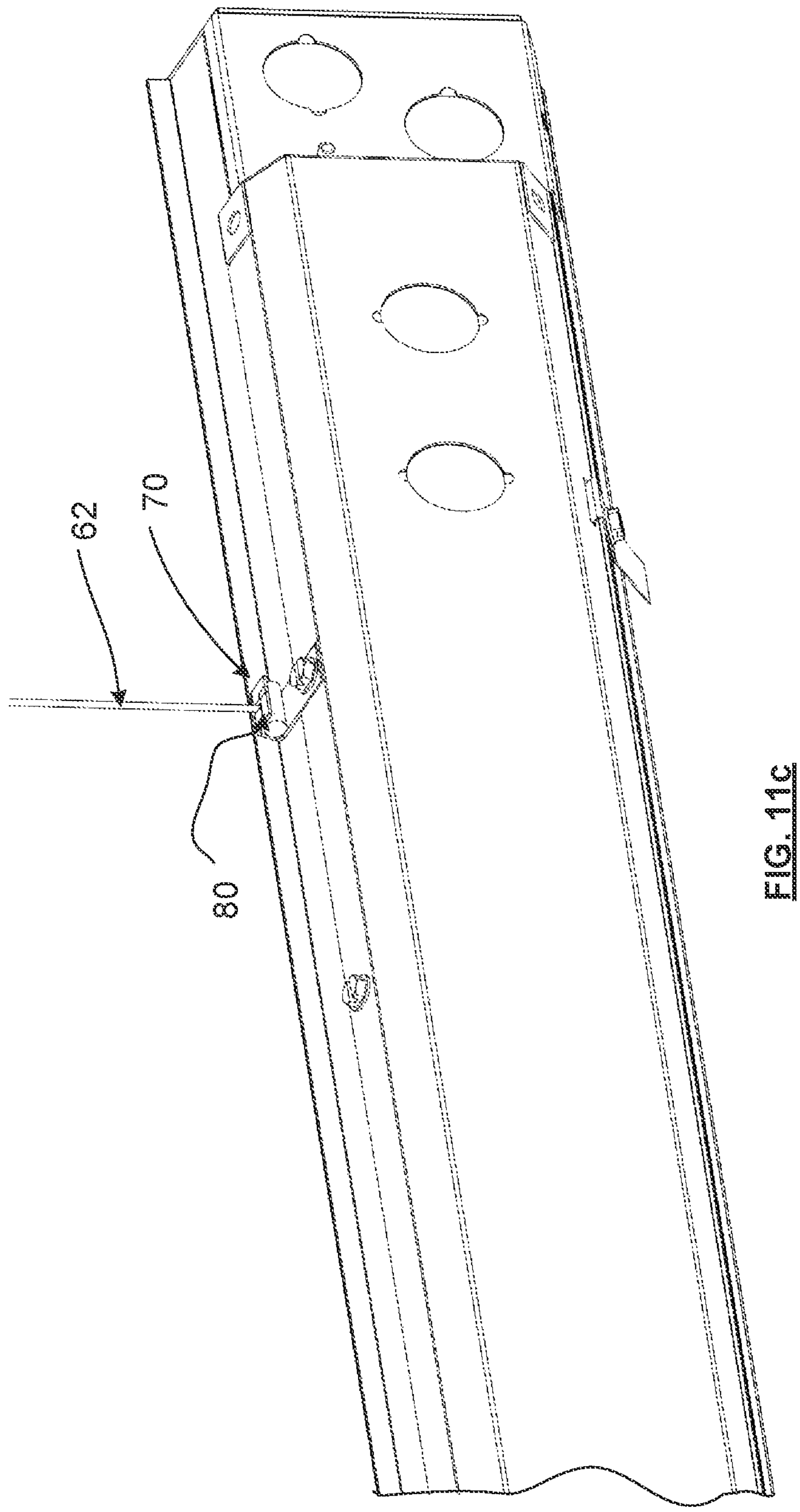

Thus, while in some exemplary embodiments as shown in FIG. 6, the suspension structures 62 may be fastened at their respective opposite ends with anchor fasteners 64, other exemplary embodiments may use other fastening modes. For instance, as shown in FIGS. 11*a* to 11*c*, such anchoring may be achieved by way of an anchoring structure shown at 70 which is positionable on the light fixture body 32, and configured to receive an end region 62*a* of the suspension structure 62. As will be described, a locking structure, shown at 72, is movable between a releasable positon as shown in FIG. 11*b* to receive the end region of the suspension structure 62 and a lock position as shown in FIG. 11*c* to hold the suspension structure 62 in the anchoring structure 70.

In some embodiments, the suspension structure 62 may be provided in the form of a cable 62, while the end region of the cable 62 may be configured with an enlarged cable end structure 74. The anchoring structure 70 includes a yoke portion 76 to receive the enlarged cable end structure 74 (as shown in FIG. 11*b*), along with a gap 78 to receive the cable 62. The locating structure 72 may be provided as a tab 80 which is configured to rotate according to arrow R1 from its upright (gap-open) position (FIG. 11*b*) to an inclined (gap-closed) position (FIG. 11*c*) wherein it extends across the gap 78 in the locking position to hold the cable therein. In this case, the tab 80 may be formed together with the yoke portion 76 from a single blank of metal, along with a mounting portion 82 to receive fastener 84 to mount the anchoring structure on the light fixture body 32.

Figure 11D:
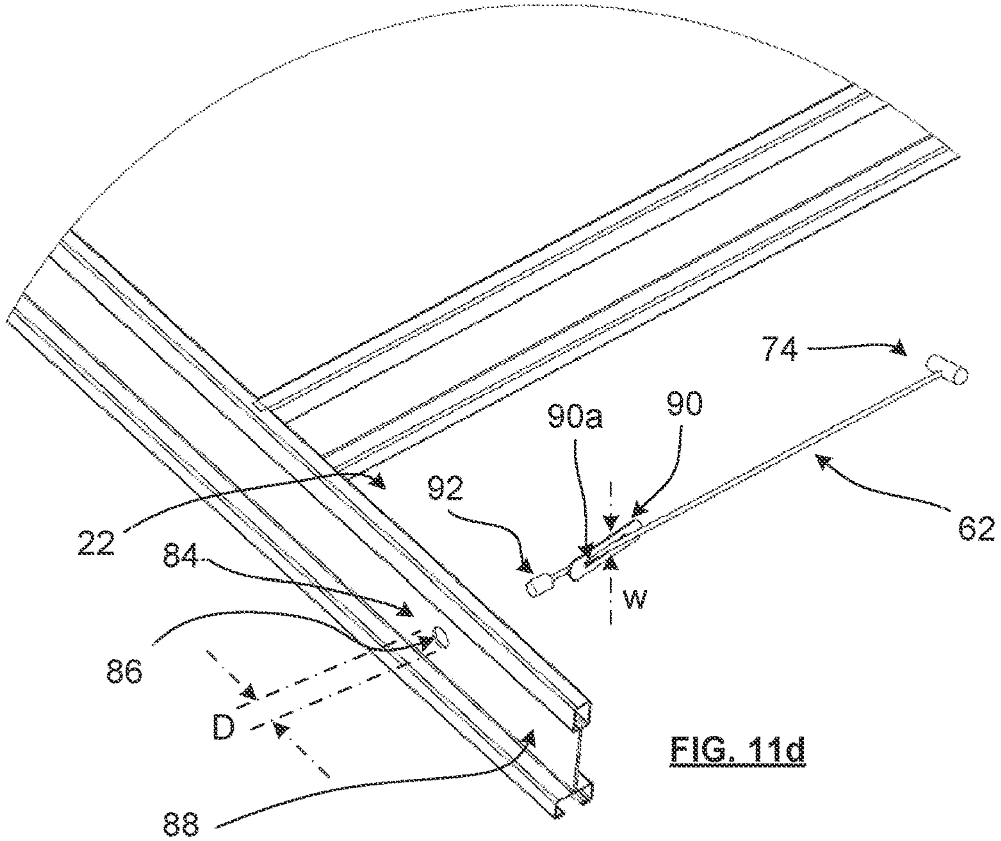
Figure 11E:
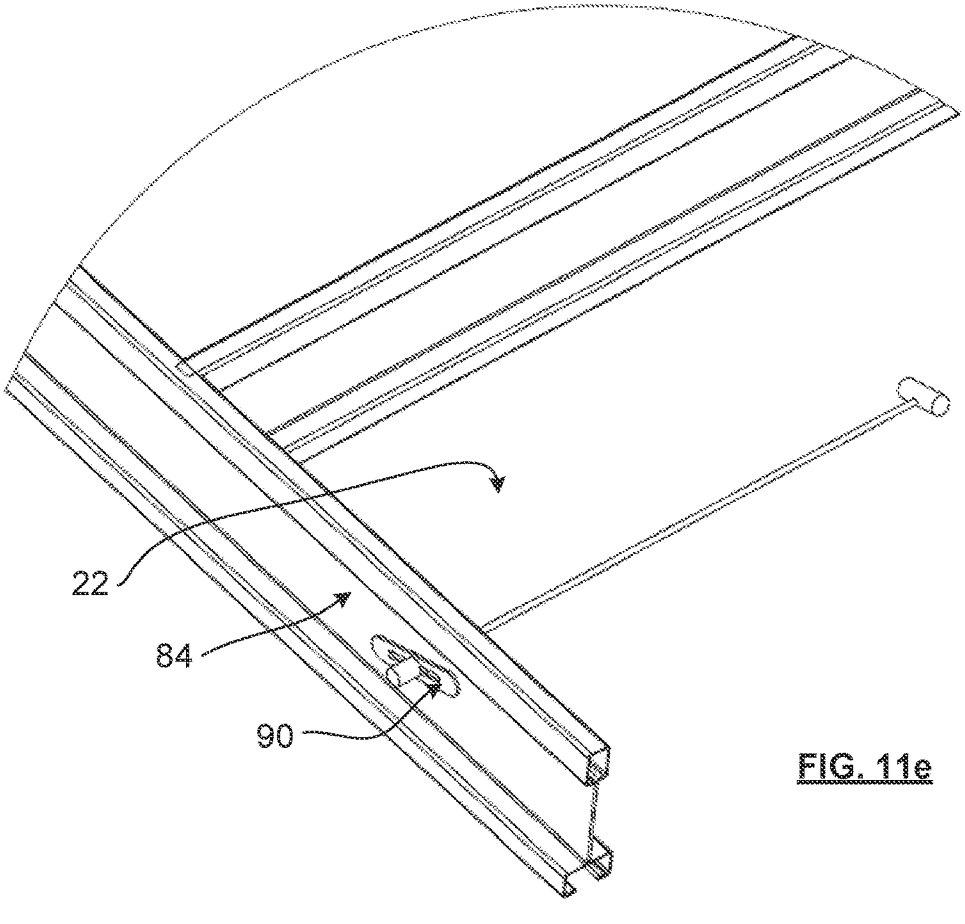

In some exemplary embodiments, as shown in FIGS. 11*d* and 11*e*, the suspension structures 62 may be anchored to a corresponding location shown at 84, adjacent to the light fixture receiving region 22, which in this case is provided by a passage 86 in a corresponding ceiling structural unit 88, for example at t-bar structural unit. The suspension structure 62, in this case cable 62, may be provided with an anchoring unit 90 with a lateral dimension W and a passage 90*a* to receive the cable 62 therethrough and which is held thereon by way of cable end structure 92, to fit through the diameter D of the passage 86. The cable 62 is of sufficient length to enable the anchoring unit to be drawn through the passage 86, in the orientation shown in FIG. 11*d*, and then reoriented laterally to cross the passage, as shown in FIG. 11*e*, thus to anchor the cable 62.

Figure 10:
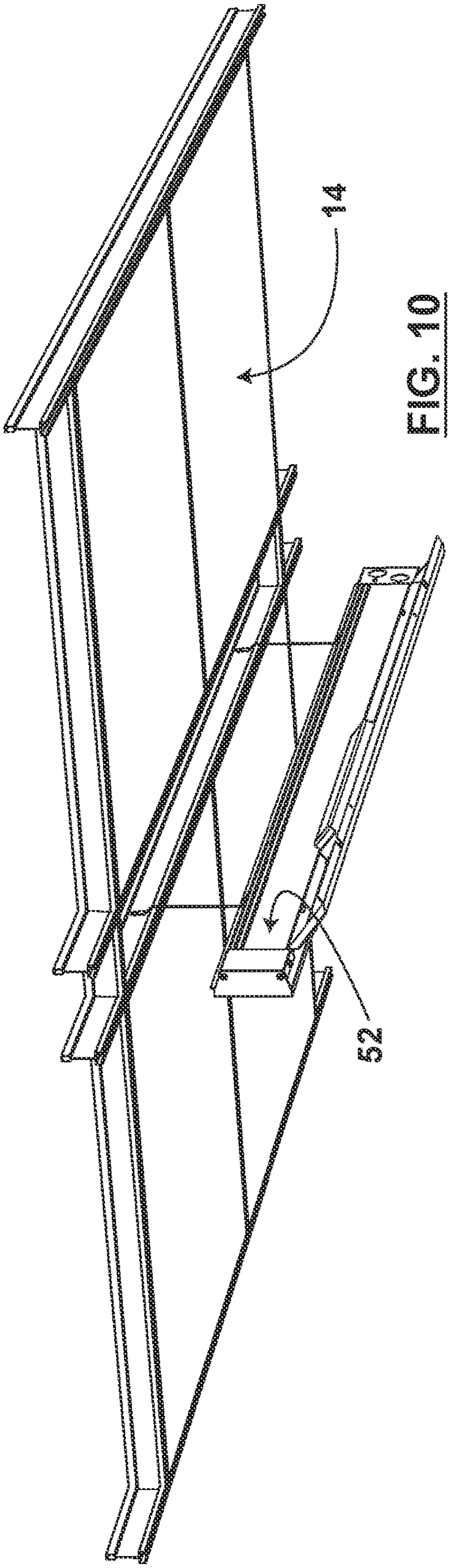
FIG. 10 is a perspective view of a light fixture installation of FIGS. 1 and 2 in still another configuration.

Thus, in some exemplary embodiments, one or more light fixtures 12 may be mounted in a corresponding receiving region 22 by first attaching the suspension structures 62 such as described above and as shown, for example, in FIG. 6 or in FIGS. 11*a* to 11*c*, between each of the light fixtures 12 and the corresponding receiving region 22, thereby to provide the light fixtures 12 in the servicing mode as shown in FIG. 10 for one such light fixture. Thus, with the opening 52 open to the side of the housing in the servicing mode and below the ceiling structure 14, the installer may complete such tasks as installing and/or switching components and completing wiring attachments between neighbouring light fixtures in the servicing mode and/or to one or more power supplies, all the while maintaining the light fixtures in the servicing mode below the ceiling structure. If desired, the light fixtures 12 may also be joined together directly, in end to end fashion, or joined to intermediate connection structures, hubs and the like to form assembled light fixtures, for example by way of the coupling assembly described in co-pending U.S. application Ser. No. 15/603,070, filed May 23, 2017, entitled ROTATIONAL COUPLERS FOR LIGHT FIXTURES, the entire subject matter of which is incorporated herein by reference. Such coupling assembly enables the installer to use a drive tool in a horizontal direction (i.e. with the drive axis of the drive tool being horizontal) which, in some cases, may be particularly beneficial because the light fixtures are below the ceiling structure 14. The servicing mode thus enables a number of such light fixtures to be joined together with the installer not needing access for a sight line above the light fixture, and further without requiring access for a sight line above the ceiling structure 14 itself, to make carry out the above described assembly steps as is usually required with conventional light fixtures.

In some exemplary embodiments, once the two or more light fixtures may thus be fully assembled and joined together, their covers may be closed. The so formed light fixture assembly thus may present a composite flange 37 made up of the individual aligned flanges 37 of the two or more light fixtures, along with a number of spring elements 24 located along the assembled length of the assembly. Thus, to complete the installation, the installer may first locate the aligned flanges 37 on the support surface 38 as shown in FIGS. 3 and 4, and progressively raise the second boundary region 40 upwardly to cause the spring elements 24 to make contact with and slide against upright surface 40 until they pass above first support surface 30.

The light fixture assembly may be provided in a kit of parts or in two or more subassemblies, including various combinations of the features described in the present disclosure. Other features, such as the spring element 24 and components associated therewith, may also be provided in one or more kits or subassemblies.

Referring to FIGS. 6 and 14, a release tool may be deployed to displace the spring element 24 to its released position according to arrow R. Such tool may be a screw driver 66 as shown in FIG. 13, or the like which is suitably dimensioned to be oriented through the gap between surfaces 40 and 44 and then configured to contact the spring 24. A downward motion by the tool, as represented by arrow D1 in FIGS. 6 and 13, thus causes the spring element 24 to displace according to arrow R. These steps may then be carried out for each of the spring elements 24 to progressively release the linear light fixture 12, thus causing it to rotate from the position shown in FIG. 6 to the intermediate inclined position as shown in FIGS. 3 and 4. Next, the linear light fixture 12 may then be transferred as shown by D2 in FIG. 4, to disengage the surface 36 from the surface 38 to release the linear light fixture 12 from its operative mode in the light fixture receiving region 22 toward, for example, the servicing mode as shown in FIG. 10. Thus, in some exemplary embodiments, the light mounting structure 16, or the light fixture 10 when the former is integrated therewith, may be installed and removed from the light fixture receiving region 22 without requiring any special tools. In the case of screw driver 66 need not be aligned with any particular location on the spring element 24, other than to be oriented to be displaced downwardly along D1 to cause to rotation R.

Thus, in some exemplary embodiments, the light fixture assembly 10 may be configured to provide a linear light fixture installation, wherein the ceiling structure 14 is provided with an elongate receiving region in the example of light fixture receiving region 22. The linear light fixture 12 may thus be configured with an elongate body such as the light fixture body 32, to define an elongate opening 52 to expose one or more light fixture components when in a servicing mode and accessible through the opening. An elongate cover, such as cover 56 may be hingedly engaged along a boundary of the elongate opening 52 to cover the opening 52. In this case, the cover 56 may be configured to present an otherwise inner surface with one or more light fixture components positioned thereon. One or more support elements, such as the suspension structures 62, may be configured to join a second boundary of the body 32 with the ceiling structure 14. The light fixture may be further configured to be releasable from an operative mode when installed in the elongate receiving region of the ceiling structure 14 to a servicing mode, when suspended by the suspension structures 62 below the ceiling structure with the first boundary of the elongate opening 52 positioned above the second boundary of the elongate opening 52, and with the cover 56 oriented below the second boundary of the elongate opening to present the elongate opening 52 laterally to permit servicing of the light fixture 12 from a side thereof in the servicing mode.

Thus, in some exemplary embodiments, the cover 56 may present a surface on which one or more components may be installed and thus be presented in a serviceably accessible condition in the servicing mode. Thus, the light fixture body 32 and cover 56 may be configured to open in a manner similar to a clam shell, by providing two hinged or pivotally coupled halves or sections of the light fixture body and with each half including one of a pair of opposed surfaces defining boundaries of an interior and which, in the servicing mode, open to present both surfaces laterally (or in a horizontal direction) relative to the ceiling structure, when suspended therefrom in a manner to allow such opening to occur, by securing the suspension structures 62 adjacent a longitudinal boundary of one of the halves and distal to a hinge point between the hinged halves or sections.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A light fixture assembly for supporting a light fixture in a ceiling structure, comprising a light fixture mounting structure having a pair of opposed boundary regions extending between opposed end regions and configured to fit within a designated light fixture receiving region in the ceiling structure, and a plurality of flat spring elements configured to be spaced outwardly from at least one of the boundary regions, each flat spring element having parallel opposed surface regions and a mounting region configured to be anchored to the mounting structure, wherein the at least one boundary region includes a continuous recess extending continuously from one end region and along the boundary region to the other end region, the continuous recess bordered by a pair of spaced opposed wall structures configured to receive an anchor fastener and hold the anchor fastener therebetween, wherein the anchor fastener is associated with the mounting region of a corresponding flat spring element for anchoring the flat spring element in a position at any location along the continuous recess of the boundary region, a free end region adjacent the parallel opposed surface regions to extend from the mounting region and to be laterally outwardly biased in a first position away from the corresponding boundary region, each of the flat spring elements further configured to be movable from the first position toward the corresponding boundary region in a second position as the flat spring elements make contact with and slide against an upright surface of the designated light fixture receiving region until the flat spring elements pass above a support surface region on the ceiling structure and return to the first position to form a path of contact with the support surface region to anchor the mounting structure in the receiving region, each of the flat spring elements configured to be movable from the first position toward the corresponding boundary region in the second position to release the path of contact, and to release the mounting structure from the receiving region.

2. The light fixture assembly of claim 1, wherein each of the wall structures includes a lip projecting therefrom to threadably engage the anchor fastener.

3. The light fixture assembly of claim 1, wherein each of the boundary regions has a remote end region with the corresponding continuous recess located therein, further comprising an opening between the remote end regions, the opening in communication with a body and at least one cover to contain light fixture components therein, and wherein each fastener of each of the plurality of flat spring elements is positionable along the continuous recess to accommodate the at least one cover.

4. The light fixture assembly of claim 1, wherein each of the boundary regions has a remote end region with the corresponding continuous recess located therein, further comprising an opening between the remote end regions, the opening in communication with a body and a plurality of covers to contain light fixture components therein, and wherein each fastener of each of the plurality of flat spring elements is positionable along the continuous recess to accommodate the plurality of covers.

5. The light fixture assembly of claim 2, wherein the boundary region is interrupted by the recess to form a pair of opposed boundary region segments, each of which is adjacent a terminus of a corresponding one of the spaced opposed wall structures, and wherein each mounting region includes a mounting surface region which engages both of the opposed boundary region segments by the anchor fastener.

6. The light fixture assembly of claim 5, wherein each mounting region has a pair of opposed mounting surface regions, each to respectively engage the fastener and the boundary region.

7. The light fixture assembly of claim 5, wherein each mounting region includes an opening to receive the anchor fastener, and a bend region adjacent the opening to delineate the mounting region and the free end region.

8. The light fixture assembly of claim 5, wherein the flat spring elements are separate from one another.

9. The light fixture assembly of claim 5, wherein the light fixture mounting structure is integrally formed with a light fixture body.

10. The light fixture assembly of claim 9, wherein the light fixture body comprises at least one of the boundary regions with the plurality of flat spring elements to be positioned therealong.

11. The light fixture assembly of claim 10, wherein the light fixture body comprises the pair of opposed boundary regions.

12. A light fixture assembly for supporting a light fixture in a ceiling structure, comprising a light fixture mounting structure having a pair of opposed boundary regions configured to fit within a designated light fixture receiving region in the ceiling structure, and at least one flat spring element configured to be spaced outwardly from at least one of the boundary regions, each flat spring element having parallel opposed surface regions, a mounting region configured to be anchored to the mounting structure, wherein the at least one of the boundary regions includes a continuous recess extending along the opposed boundary regions to receive an anchor fastener associated with the mounting region of a corresponding flat spring element for anchoring the flat spring element in a position anywhere along the boundary region, and a free end region adjacent the parallel opposed surface regions and configured to extend from the mounting structure and to be laterally outwardly biased in a first position away from the corresponding boundary region to form a path of contact with a support surface region on the ceiling structure to anchor the mounting structure in the receiving region, each flat spring element further configured to be movable from the first position toward the corresponding boundary region in a second position as the flat spring element makes contact with and slides against an upright surface of the designated light fixture receiving region until the flat spring element passes above a support surface region on the ceiling structure and returns to the first position to form the path of contact with the support surface region to anchor the mounting structure in the receiving region, each flat spring element configured to be movable from the first position toward the corresponding boundary region in the second position to release the path of contact to release the mounting structure from the light fixture receiving region.

13. The light fixture assembly of claim 12, wherein each mounting region includes a mounting surface region which engages the boundary region by the anchor fastener.

14. The light fixture assembly of claim 12, wherein each mounting region has a pair of opposed mounting surface regions, each to respectively engage the fastener and the boundary region.

15. The light fixture assembly of claim 12, wherein each mounting region includes an opening to receive the anchor fastener, and a bend region adjacent the opening to delineate the mounting region and the free end region.

16. The light fixture assembly of claim 12, wherein the light fixture mounting structure is integrally formed with a light fixture body.

17. The light fixture assembly of claim 16, wherein the light fixture body comprises at least one of the boundary regions with the at least one flat spring element to be positioned therea long.

18. A light fixture assembly for supporting a light fixture in a ceiling structure, comprising a light fixture mounting structure having a pair of boundary regions configured to fit within a designated light fixture receiving region in the ceiling structure with each boundary region including a continuous recess extending therealong, and a plurality of flat spring elements configured to be spaced outwardly from the boundary regions, each flat spring element having parallel opposed surface regions and a mounting region configured to be anchored to the mounting structures at a position along the corresponding recess, wherein the recess in each of the boundary regions is configured to receive an anchor fastener associated with the mounting region of a corresponding flat spring element for anchoring each flat spring element in a position anywhere along the boundary region, and wherein each of the flat spring elements includes a free end region adjacent the parallel opposed surface regions to extend from the mounting region and to be laterally outwardly biased in a first position away from the corresponding boundary region to form a path of contact with a support surface region on the ceiling structure to anchor the mounting structure in the receiving region, each flat spring element further configured to be movable from the first position toward the corresponding boundary region in a second position as the flat spring element makes contact with and slides against an upright surface of the designated light fixture receiving region until the flat spring element passes above a support surface region on the ceiling structure and returns to the first position to form the path of contact with the support surface region to anchor the mounting structure in the receiving region, each flat spring element configured to be movable from the first position toward the corresponding boundary region in the second position to release the path of contact to release the mounting structure from the receiving region.

19. The light fixture assembly of claim 18, wherein each mounting region includes a mounting surface region which engages the boundary region by the anchor fastener.

20. The light fixture assembly of claim 19, wherein each mounting region has a pair of opposed mounting surface regions, each to respectively engage the fastener and the boundary region.

21. The light fixture assembly of claim 20, wherein each mounting region includes an opening to receive the anchor fastener, and a bend region adjacent the opening to delineate the mounting region and free end region.

22. The light fixture assembly of claim 21, wherein the flat spring elements are separate from one another.

23. The light fixture assembly of claim 22, wherein the light fixture mounting structure is integrally formed with a light fixture body.

24. The light fixture assembly of claim 23, wherein the light fixture body comprises at least one of the boundary regions with the plurality of flat spring elements to be positioned therealong.

25. The light fixture assembly of claim 24, wherein the light fixture body comprises the pair of opposed boundary regions.

* * * * *